(12) United States Patent
Okawa et al.

(10) Patent No.: US 11,131,013 B2
(45) Date of Patent: Sep. 28, 2021

(54) NI-BASED ALLOY, GAS TURBINE MATERIAL, AND METHOD FOR MANUFACTURING NI-BASED ALLOY

(71) Applicant: THE JAPAN STEEL WORKS, LTD., Tokyo (JP)

(72) Inventors: Takuya Okawa, Muroran (JP); Koichi Takasawa, Muroran (JP); Eiji Maeda, Muroran (JP); Masato Yoshida, Muroran (JP)

(73) Assignee: JAPAN STEEL WORKS M&E, INC., Muroran (JP)

( * ) Notice: Subject to any disclaimer, the term of this patent is extended or adjusted under 35 U.S.C. 154(b) by 0 days.

(21) Appl. No.: 16/486,259

(22) PCT Filed: Feb. 16, 2018

(86) PCT No.: PCT/JP2018/005533
§ 371 (c)(1),
(2) Date: Aug. 15, 2019

(87) PCT Pub. No.: WO2018/151262
PCT Pub. Date: Aug. 23, 2018

(65) Prior Publication Data
US 2020/0239993 A1   Jul. 30, 2020

(30) Foreign Application Priority Data

Feb. 17, 2017 (JP) .............. JP2017-027525

(51) Int. Cl.
*C22F 1/10* (2006.01)
*C22C 19/05* (2006.01)
*F01D 5/28* (2006.01)

(52) U.S. Cl.
CPC .............. *C22F 1/10* (2013.01); *C22C 19/056* (2013.01); *F01D 5/28* (2013.01); *F05C 2201/0466* (2013.01)

(58) Field of Classification Search
CPC ........ C22C 19/055; C22C 19/056; C22F 1/10
See application file for complete search history.

(56) References Cited

U.S. PATENT DOCUMENTS

| | | | |
|---|---|---|---|
| 5,611,670 A | 3/1997 | Yoshinari et al. | |
| 6,419,763 B1 | 7/2002 | Konter et al. | |
| 2003/0164213 A1* | 9/2003 | Ueta .................. | C22F 1/10 148/677 |
| 2004/0177901 A1 | 9/2004 | Yoshinari et al. | |
| 2005/0129567 A1* | 6/2005 | Kirchheiner ......... | C22C 19/055 420/448 |
| 2005/0236079 A1 | 10/2005 | Ueta et al. | |
| 2008/0166258 A1 | 7/2008 | Tanimoto et al. | |
| 2009/0136382 A1 | 5/2009 | Matsui et al. | |
| 2010/0226814 A1* | 9/2010 | Uehara ................. | C22C 19/055 420/449 |
| 2010/0310412 A1 | 12/2010 | Kloewer et al. | |
| 2012/0288400 A1* | 11/2012 | Hirata .................. | C22C 19/055 420/448 |
| 2015/0159241 A1* | 6/2015 | Hamaguchi .......... | C22C 19/055 420/443 |
| 2015/0284823 A1 | 10/2015 | Osaki et al. | |

FOREIGN PATENT DOCUMENTS

| | | |
|---|---|---|
| CN | 1123874 A | 6/1996 |
| CN | 101896630 A | 11/2010 |
| CN | 104278175 A | 1/2015 |
| EP | 2 298 946 A2 | 3/2011 |
| EP | 2383355 A1 | 11/2011 |
| EP | 2 835 434 A2 | 2/2015 |
| JP | 2004-197131 A | 7/2004 |
| JP | 2005-314728 A | 11/2005 |
| JP | 2008-179845 A | 8/2008 |
| JP | 2011-84812 A | 4/2011 |
| JP | 2012-219339 A | 11/2012 |
| JP | 2014-19916 A | 2/2014 |
| JP | 2015-30916 A | 2/2015 |
| JP | 2015-155561 A | 8/2015 |
| WO | 2007/119832 A1 | 10/2007 |

OTHER PUBLICATIONS

Choudhury, I. A., and M. A. El-Baradie. "Machinability of nickel-base super alloys: a general review." Journal of Materials Processing Technology 77.1-3 (1998): 278-284.*
Search Report dated May 22, 2018, issued by the International Searching Authority in International Application No. PCT/JP2018/005533 (PCT/ISA/210).
Written Opinion dated May 22, 2018, issued by the International Searching Authority in International Application No. PCT/JP2018/005533 (PCT/ISA/237).
Communication dated Sep. 2, 2020, from the State Intellectual Property Office of People's Republic of China in Application No. 201880012192.4.

* cited by examiner

*Primary Examiner* — Jessee R Roe
(74) *Attorney, Agent, or Firm* — Sughrue Mion, PLLC

(57) ABSTRACT

The purpose of the present invention is to enhance the creep characteristics of an Ni-based alloy. The present invention relates to a Ni-based alloy characterized by having a composition containing, in terms of wt %, 15.00-25.00% Cr, 5.00-15.00% Co, 1.00% to less than 12.00% Mo, 1.50-2.50% Ti, 1.00-2.00% Al, 0.20-1.00% Nb, and 0.0010-0.10% C, and in terms of mass ppm, 10-200 ppm P, 30-250 ppm B, and 30-200 ppm N, the remainder comprising Ni and unavoidable impurities.

9 Claims, 3 Drawing Sheets

[FIG. 1]
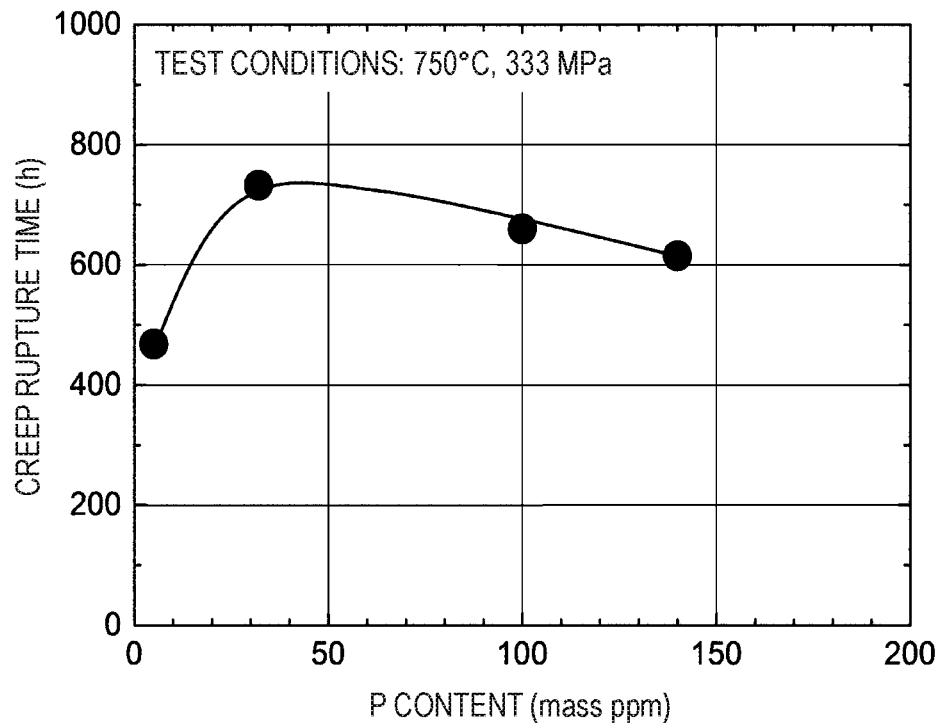
[FIG. 2]
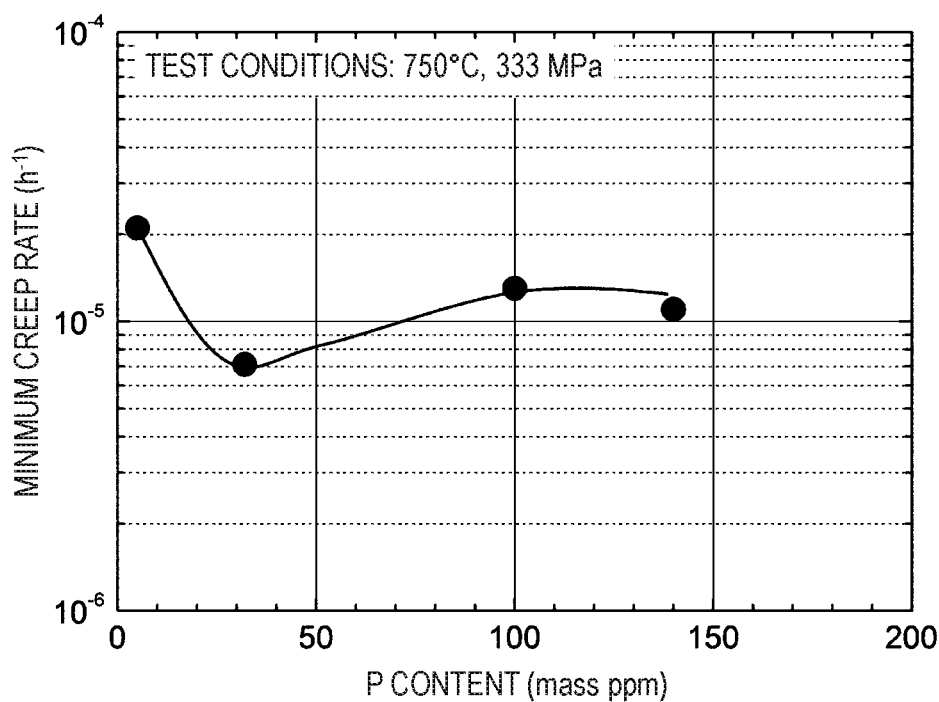

[FIG. 3]
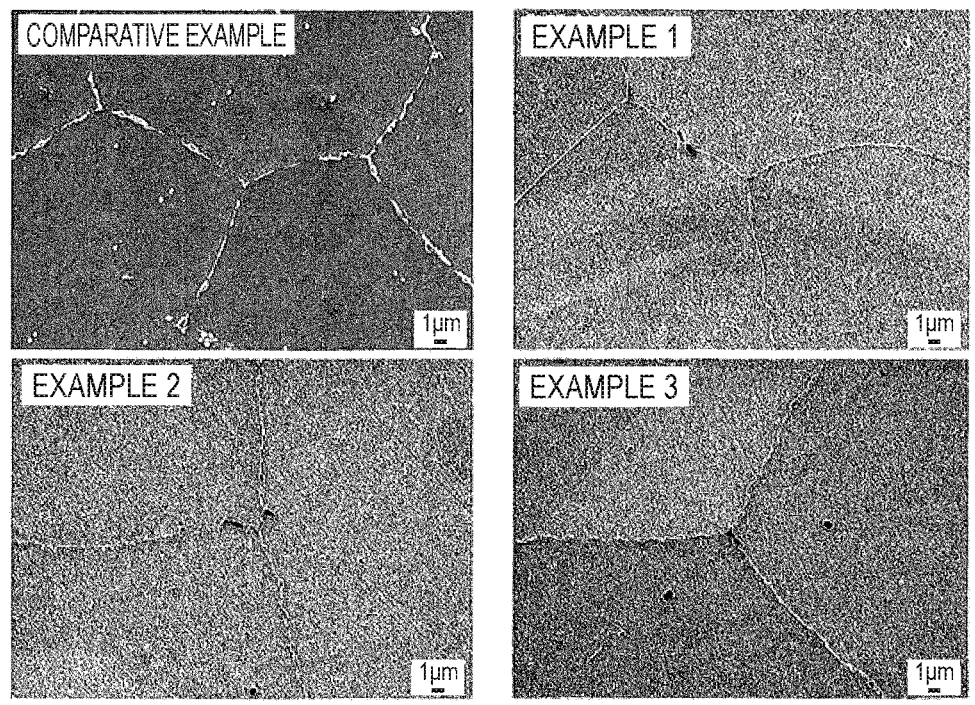
[FIG. 4]
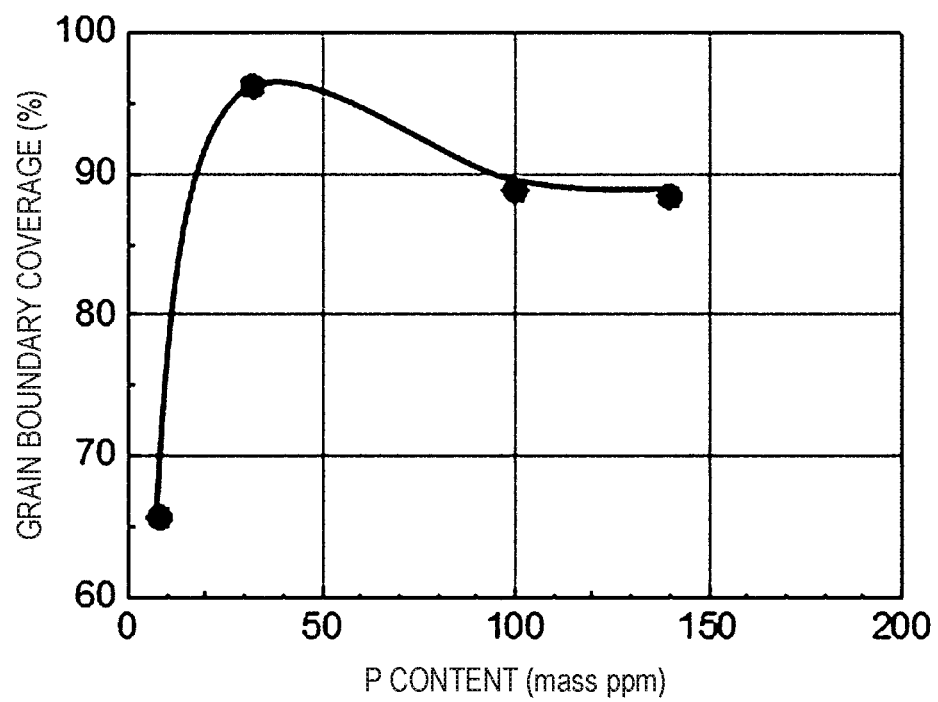

[FIG. 5]
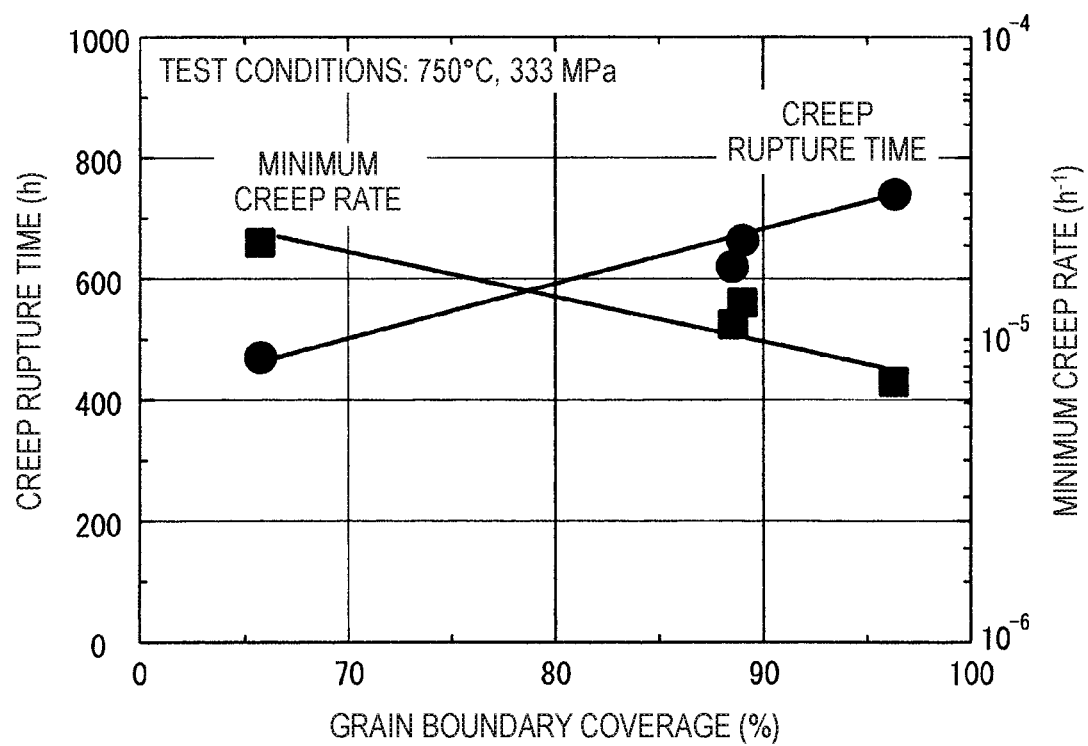

ated phase called a γ' (gamma prime) phase composed of
NI-BASED ALLOY, GAS TURBINE MATERIAL, AND METHOD FOR MANUFACTURING NI-BASED ALLOY

TECHNICAL FIELD

The present invention relates to a Ni-based alloy excellent in creep properties, a gas turbine material, and a method for manufacturing a Ni-based alloy excellent in creep properties.

BACKGROUND ART

Ni-based alloys exhibit excellent mechanical properties at high temperature, and have been widely used as high-temperature components of various machine devices including gas turbines. Generally, in a Ni-based alloy, a precipitated phase called a γ' (gamma prime) phase composed of $Ni_3(Al, Ti)$ or a γ" (gamma double prime) phase composed of $Ni_3(Al, Ti, Nb)$ is finely precipitated in crystal grains by adding a small amount of Al or Ti, or Nb or Ta, thereby exhibiting excellent strength. However, as the operating temperature rises, in the alloy, crystal grain boundaries (hereinafter abbreviated as grain boundaries) become weakening factors in creep deformation than the inside of crystal grains, so that it is needed to suitably strengthen the grain boundaries for use at higher temperature. In order to strengthen the grain boundaries, it is necessary to form some hetero phases such as precipitates at the grain boundaries. Furthermore, the desired properties cannot be secured unless the ratio in which the hetero phases cover the grain boundaries, i.e., grain boundary coverage, is controlled to an appropriate value or more.

Conventionally, as a method for enhancing the strength of grain boundaries, a method of dispersing carbides or hard phases in the grain boundaries has been proposed. For example, in PTL 1 of our application, carbides of MC or $M_{23}C_6$ type (M: metal element, C: carbon) are precipitated at the grain boundaries so that the carbide area ratio, which is defined as a value obtained by dividing the area rate of the carbides at the grain boundaries by the area rate of the carbides in the crystal grains, satisfies 0.6 to 3.0, and thus grain boundary strengthening of a Ni-based superalloy for a thermal power generation turbine rotor is achieved.

In PTL 2, it is attempted to strengthen grain boundaries by using carbides.

Furthermore, in PTL 3, strengthening is attempted by dispersing hard phases composed of alumina in grain boundaries.

CITATION LIST

Patent Literature

PTL 1: JP-A-2012-219339
PTL 2: JP-A-2005-314728
PTL 3: JP-A-2008-179845

SUMMARY OF INVENTION

Technical Problem

However, the carbide area ratio handled in PTL 1 depends on the amount of the carbide in the crystal grains, and there is a possibility that only grain boundaries are not strengthened effectively. In PTL 2, the grain boundary coverage is unknown, and there is a possibility that optimum grain boundary strengthening is not performed. In addition, a special heat treatment step is required to make the carbides lumpy, which may increase production costs. In PTL 3, the grain boundary coverage with the hard phases is not specified, and it is unclear whether grain boundary strengthening is optimally performed.

As described above, some Ni-based alloys have been hitherto developed in which an improvement in the creep properties is attempted by grain boundary strengthening but, from the viewpoint of desired creep properties and suppression of production costs, it is hard to say that the most suitable method has been established.

The present invention has been made to solve these situations, and an object thereof is to provide a Ni-based alloy excellent in creep properties, a gas turbine material, and a method for manufacturing a Ni-based alloy excellent in creep properties.

Solution to Problem

A Ni-based alloy having a composition comprising, in terms of % by mass, Cr: 15.00 to 25.00%, Co: 5.00 to 15.00%, Mo: 1.00% or more and less than 12.00%, Ti: 1.50 to 2.50%, Al: 1.00 to 2.00%, Nb: 0.20 to 1.00%, and C: 0.0010 to 0.10% and, in terms of ppm by mass, P: 10 to 200 ppm, B: 30 to 250 ppm, and N: 30 to 200 ppm, the balance being Ni and unavoidable impurities.

The invention of the Ni-based alloy of another embodiment is the invention according to the previous embodiment, wherein the content of P is P: 20 to 150 ppm by mass.

The invention of the Ni-based alloy of another embodiment is the invention according to the previous embodiments, wherein grain boundaries are strengthened with precipitated carbides.

The invention of the Ni-based alloy of another embodiment is the invention according to the previous embodiments, wherein the grain boundary coverage defined by the ratio of the length of grain boundaries covered with carbides to the length of grain boundaries in the alloy is 85% or more.

The invention of the Ni-based alloy of another embodiment is the invention according to the previous embodiments, wherein the creep rupture time at 750° C. and 333 MPa is 600 hours or more.

The invention of the Ni-based alloy of another embodiment is the invention according to the previous embodiments, wherein the minimum creep rate at 750° C. and 333 MPa is $1.5 \times 10^{-5} h^{-1}$ or less.

A gas turbine material of the invention comprises the Ni-based alloy according to previous embodiments.

A method for manufacturing a Ni-based alloy, comprising: subjecting the Ni-based alloy according to the previous embodiments to a solution treatment; and subsequently subjecting the Ni-based alloy to an aging treatment twice at a temperature of 1010 to 1050° C. and at a temperature of 760 to 790° C.

Advantageous Effects of Invention

The Ni-based alloy of the present invention is excellent in creep properties. In addition, according to the method for manufacturing a Ni-based alloy of the present invention, a Ni-based alloy excellent in creep properties can be obtained.

BRIEF DESCRIPTION OF DRAWINGS

FIG. 1 is a graph showing a relationship between the creep rupture time and the P content of the Ni-based alloys of Examples and Comparative Examples.

FIG. 2 is a graph showing a relationship between the minimum creep rate and the P content of the Ni-based alloys of Examples and Comparative Examples.

FIG. 3 is an FE-SEM image in the vicinity of grain boundaries of the Ni-based alloys of Examples and Comparative Example.

FIG. 4 is a graph showing a relationship between the grain boundary coverage and the P content of the Ni-based alloys of Examples and Comparative Example.

FIG. 5 is a graph showing a relationship among the grain boundary coverage, the creep rupture time, and the minimum creep rate of the Ni-based alloys of Examples and Comparative Example.

DESCRIPTION OF EMBODIMENTS

Hereinafter, an embodiment of the present invention will be described. The present invention is not limited to the embodiment described below.

The Ni-based alloy of the present invention may have a composition comprising, in terms of % by mass or ppm by mass, Cr: 19 to 21%, Co: 9 to 11%, Mo: 1 to 10%, Ti: 1.8 to 2.2%, Al: 1.1 to 1.5%, Nb: 0.3 to 0.7%, C: 0.04 to 0.08%, P: 30 to 140 ppm, B: 30 to 70 ppm, and N: 40 to 80 ppm, the balance being Ni and unavoidable impurities.

The following will explain the action and limitation reasons of the technical matters defined in the present invention. Among the alloy compositions, the contents of P, B, and N are shown in terms of ppm by mass, and the contents of the other elements are shown in terms of % by mass. Further, ppm by mass and % by mass have the same meanings as ppm by weight and % by weight, respectively, and " . . . to . . . " means that it is not less than the lower limit value and not more than the upper limit value.

Cr: 15.00 to 25.00%

Cr is an element necessary for enhancing oxidation resistance, corrosion resistance, and strength. Also, it combines with C to form a carbide, thereby enhancing high-temperature strength. However, too large content thereof invites destabilization of the matrix and promotes the formation of harmful TCP phases such as a σ phase and α-Cr, resulting in adverse influences on ductility and toughness. Therefore, the content of Cr is limited to 15.00 to 25.00%.

For the same reason, it is preferable to control the lower limit of the Cr content to 18.00% or more and the upper limit to 22.00% or less.

Co: 5.00 to 15.00%

Co is an element that improves the segregation property of the alloy by bringing the distribution coefficients of alloying elements such as Al, Ti, Nb, and W close to 1. When the content of Co is less than 5.00%, the above effect cannot be obtained sufficiently. When it exceeds 15.00%, not only forgeability is deteriorated but also a Laves phase is easily generated, and hence the matrix structure at high temperature is rather destabilized and also high-temperature structural stability is deteriorated. Therefore, the content of Co is limited to the range of 5.00 to 15.00%.

For the same reason, it is preferable to control the lower limit of the Co content to 8.00% or more and the upper limit to 12.00% or less.

Mo: 1.00% or More and Less Than 12.00%

Mo mainly solves in the matrix to strengthen it, and also solves in the γ' phase to replace an Al site of the phase, thereby enhancing the stability of the phase. Thus, Mo is effective in enhancing both high-temperature strength and structural stability. When the Mo content is less than 1.00%, the above effects are insufficient, and when it is 12.00% or more, a Laves phase is easily generated, so that the matrix structure at high temperature is rather destabilized and also the high-temperature structural stability is deteriorated. Therefore, the content of Mo is limited to the range of 1.0% or more and less than 12.00%.

For the same reason, it is preferable to control the lower limit of the Mo content to 5.00% or more and the upper limit to 10.00% or less.

Ti: 1.50 to 2.50%

Ti mainly forms a MC carbide to suppress crystal grain coarsening of the alloy and also combines with Ni to precipitate a γ' phase, thereby contributing to precipitation strengthening of the alloy. However, when Ti is exceedingly contained, the stability of the γ' phase at high temperature is lowered and an η phase is formed, thereby impairing strength, ductility, toughness, and high-temperature long-term structural stability. Therefore, the content of Ti is limited to the range of 1.50 to 2.50%.

For the same reason, it is preferable to control the lower limit of the Ti content to 1.80% or more and the upper limit to 2.20% or less.

Al: 1.00 to 2.00%

Al combines with Ni to precipitate a γ' phase, thereby contributing to precipitation strengthening of the alloy. However, when the content thereof is too large, the γ' phase aggregates at grain boundaries and is coarsened, thereby remarkably impairing mechanical properties at high temperature and also lowering hot workability. Therefore, the Al content is limited to 1.00 to 2.00%.

For the same reason, it is preferable to control the lower limit of the Al content to 1.30% or more and the upper limit to 1.70% or less.

Nb: 0.20 to 1.00%

Nb is an element that stabilizes the γ' phase and contributes to strength enhancement, however, when Nb is exceedingly contained, the precipitation of the η phase, the σ phase, and the Laves phase that are harmful phases is promoted, thereby remarkably lowering the structural stability. Therefore, the content of Nb is limited to 0.20 to 1.00%. For the same reason, it is preferable to control the lower limit thereof to 0.30% or more and the upper limit to 0.70% or less.

P: 10 to 200 ppm

The present inventors have found that P has an effect of suppressing intra-grain precipitation of carbides and increasing grain boundary carbides during holding and cooling in the solution treatment and the first-stage aging. Specifically, in order to obtain effects of precipitating the grain boundary carbides and reducing the minimum creep rate, it has been found that grain boundary coverage defined by the ratio of the length of grain boundaries covered with carbides to the length of grain boundaries in the alloy (hereinafter, also simply referred to as "grain boundary coverage") should be 85% or more, and for that purpose, a P content of 10 ppm or more is necessary. However, when P is excessively contained, there is a possibility that grain boundary segregation of P becomes excessive to lower the consistency of the grain boundaries, and ductility reduction and the like are brought about. Therefore, the upper limit of the P content is limited to 200 ppm.

For the same reason, it is preferable to control the lower limit of the P content to 20 ppm or more and the upper limit to 150 ppm or less.

C: 0.0010 to 0.10%

C is an additive element that forms carbides to suppress crystal grain coarsening of an alloy and precipitates at the grain boundaries to improve high-temperature strength but, since a sufficient effect for improving the strength is not exhibited when the content is small, it is necessary to contain C in an amount of at least 0.0010% or more. However, when the content is too large, there is a concern of adverse effects such as reduction of the amount of the other effective precipitates such as the γ' phase owing to excessive carbide formation, so that the upper limit is controlled to 0.10%. For the same reason, it is preferable to control the lower limit to 0.010% or more and the upper limit to 0.070% or less.

B: 30 to 250 ppm

B segregates at the grain boundaries and contributes to high-temperature properties, so that it is contained as desired. However, when B is excessively contained, a boride is prone to be formed, which contrarily invites grain boundary embrittlement. Therefore, the content of B to be contained as desired is controlled to 250 ppm or less. In order to obtain the above effect sufficiently, B is desirably contained in an amount of 30 ppm or more and, for the same reason as described above, it is preferable to control the lower limit to 40 ppm or more and the upper limit to 200 ppm or less.

N: 30 to 200 ppm

N is considered to form nitrides at grain boundaries to improve creep strength, but when the content is small, a sufficient effect cannot be obtained, and thus a content of 30 ppm or more is necessary. However, when the content is too large, excess nitrides are formed to invite ductility reduction, so that the upper limit is controlled to 200 ppm. For the same reason, it is preferable to control the lower limit to 40 ppm or more and the upper limit to 150 ppm or less.

Ni and Unavoidable Impurities: Remainder

The remainder of the Ni-based alloy of the present invention is Ni and unavoidable impurities.

The contents thereof are not particularly limited, but Ni is usually contained in an amount of 55 to 65%. Moreover, the content is preferably 58% by mass or more, and 62% by mass or less.

In addition, the unavoidable impurities are not particularly limited but, for example, S may be contained in an amount of 40 ppm or less.

The contents of the ingredients contained in the Ni-based alloy of the present invention described above can be measured, for example, by fluorescent X-ray and the like.

In the Ni-based alloy of the present invention, the creep rupture time at 750° C. and 333 MPa is preferably 600 hours or more. Further, the minimum creep rate at 750° C. and 333 MPa is preferably $1.5 \times 10^{-5} h^{-1}$ or less. In addition, the grain boundary coverage is preferably 85% or more.

By satisfying the above numerical values, very excellent creep properties are exhibited.

The method for manufacturing a Ni-based alloy of the present invention is not particularly limited, and for example, it can be smelted by a usual method.

Further, by subjecting the smelted Ni-based alloy to a solution treatment and an aging treatment, a grain boundary strengthened Ni-based alloy can be obtained.

Although the solution treatment varies depending on the composition of the alloy to be treated, the treatment can be performed, for example, under conditions of 1080 to 1100° C. for 5 to 8 hours. Under these conditions, the crystal grains are not coarsened, and become regulated fine grains having a crystal grain size according to JIS 60551: 2013 of about 5.

The aging treatment is preferably performed in two stages. The first-stage aging treatment is preferably performed at a temperature of 1010 to 1050° C. for 20 to 24 hours. Under such conditions, the γ' phase sufficiently grows and the strength is further improved. The second stage aging treatment is preferably performed at a temperature of 760 to 790° C. for 8 to 12 hours. Under such conditions, since the amount of precipitated $M_{23}C_6$-type carbides and the diameter of MC-type carbides fall within appropriate ranges, high-temperature ductility becomes good.

Moreover, after the first-stage aging, it is preferable to air-cool the alloy to a cold material once, and then to raise the temperature to the second-stage aging temperature.

In addition, processing such as forging can be further performed on the Ni-based alloy of the present invention as desired. The conditions in the processing are not particularly limited.

The Ni-based alloy manufactured by performing the solution treatment and the aging treatment under the above-described preferable conditions is grain boundary strengthened with precipitated carbides, and the grain boundary coverage is 85% or more.

Also, the alloy has properties that the creep rupture time at 750° C. and 333 MPa is 600 hours or more and the minimum creep rate at 750° C. and 333 MPa is $1.5 \times 10^{-5} h^{-1}$ or less, and is excellent in creep properties.

By applying the Ni-based alloy of the present invention as a component (gas turbine material) of high-temperature equipment such as a gas turbine, it is expected that life extension and reliability improvement of the equipment can be achieved.

EXAMPLES

Examples of the present invention will be described below based on Figures and Tables, but the present invention is not limited thereto.

A 50 kg round ingot obtained by smelting the alloy having a composition shown in Table 1 by a vacuum induction melting method was forged in a forging ratio of 3.0 to obtain a forged plate.

In the compositions shown in Table 1, P, B, and N are shown in terms of ppm by mass, and the other ingredients are shown in terms of % by mass. Further, "Bal." In Table 1 means the remainder. Incidentally, in addition to the ingredients described in Table 1, unavoidable impurities may be contained.

TABLE 1

|  | C | P | Ni | Cr | Co | Mo | Ti | Al | Nb | B | N |
|---|---|---|---|---|---|---|---|---|---|---|---|
| Comparative Example | 0.056 | 8 | Bal. | 19.77 | 10.11 | 8.52 | 2.09 | 1.53 | 0.46 | 48 | 60 |
| Example 1 | 0.054 | 32 | Bal. | 19.80 | 10.04 | 8.46 | 2.11 | 1.52 | 0.49 | 57 | 62 |
| Example 2 | 0.060 | 100 | Bal. | 19.80 | 10.14 | 8.45 | 2.11 | 1.53 | 0.51 | 49 | 66 |
| Example 3 | 0.057 | 140 | Bal. | 19.79 | 10.15 | 8.45 | 2.11 | 1.54 | 0.45 | 49 | 59 |

The obtained forged plate was cut into an appropriate size and subjected to a solution treatment at 1100° C.×5 hours and two-step aging at 1050° C.×24 hours and 790° C.×8 hours to obtain a test material.

Subsequently, the test material was machined to obtain a creep test specimen to be used in the evaluation of creep properties described below.

The creep properties were evaluated by performing a creep plate test in accordance with JIS Z2271: 2013. The test temperature was controlled to 750° C., and the test stress was controlled to 333 MPa. The minimum creep rate and the rupture time were determined from the obtained creep rate-time curve.

For each test material, using a field emission-type scanning electron microscope (FE-SEM), an FE-SEM image of about 10 fields of view was taken at a magnification of 3000, the ratio of the grain boundary length covered with precipitates to the whole grain boundary length within each field of view was determined, and the ratios were averaged to obtain grain boundary coverage.

Table 2 shows the grain boundary coverage, creep rupture time, and minimum creep rate of each test material.

FIG. 1 and FIG. 2 show P content dependency of the creep rupture time and the minimum creep rate, respectively. From the figures, it is found that the creep rupture time is longer and the minimum creep rate is smaller in Examples 1 to 3 than in Comparative Example.

FIG. 3 shows an SEM image in the vicinity of grain boundaries of each example observed by FE-SEM. In all examples, carbides were observed at the grain boundaries.

FIG. 4 shows a relationship between the P content and the grain boundary coverage. The grain boundary coverage increased as the P content increased, and became constant at about 88% regardless of the P content after the P content showed a maximum value of about 96% at 32 ppm.

FIG. 5 shows a relationship among the grain boundary coverage, the minimum creep rate, and the creep rupture time. There was observed a good correlation among the grain boundary coverage, the minimum creep rate, and creep rupture time, and it was found that, at a grain boundary coverage of 85% or more, creep properties of a creep rupture time of 600 hours or more and a minimum creep rate of $1.5 \times 10^{-5} h^{-1}$ or less were obtained.

TABLE 2

|  | Grain boundary coverage (%) | Creep rupture time (h) | Minimum creep rate ($h^{-1}$) |
|---|---|---|---|
| Comparative Example | 65.7 | 468.3 | $2.1 \times 10^{-5}$ |
| Example 1 | 96.2 | 732.7 | $7.1 \times 10^{-6}$ |
| Example 2 | 88.8 | 660.1 | $1.3 \times 10^{-5}$ |
| Example 3 | 88.4 | 615.2 | $1.1 \times 10^{-5}$ |

While the present invention has been described in detail and with reference to specific embodiments thereof, it will be apparent to one skilled in the art that various changes and modifications can be made therein without departing from the spirit and scope thereof. The present application is based on Japanese Patent Application No. 2017-027525 filed on Feb. 17, 2017, and the contents are incorporated herein by reference. Also, all the references cited herein are incorporated as a whole.

The invention claimed is:

1. A Ni-based alloy having a composition consisting of:
in terms of % by mass,
Cr: 15.00 to 25.00%;
Co: 8.00 to 15.00%;
Mo: 1.00% or more and less than 12.00%;
Ti: 1.50 to 2.50%;
Al: 1.00 to 2.00%;
Nb: 0.20 to 1.00%; and
C: 0.0010 to 0.10%; and
in terms of ppm by mass,
P: 10 to 200 ppm;
B: 30 to 250 ppm; and
N: 30 to 200 ppm,
with the balance being Ni and unavoidable impurities,
wherein the grain boundary coverage defined by the ratio of the length of grain boundaries covered with carbides to the length of grain boundaries in the alloy is 85% or more.

2. The Ni-based alloy according to claim 1, wherein the content of P is P: 20 to 150 ppm by mass.

3. The Ni-based alloy according to claim 1, wherein grain boundaries are strengthened with precipitated carbides.

4. The Ni-based alloy according to claim 1, wherein the creep rupture time at 750° C. and 333 MPa is 600 hours or more.

5. The Ni-based alloy according to claim 1, wherein the minimum creep rate at 750° C. and 333 MPa is $1.5 \times 10^{-5} h^{-1}$ or less.

6. A gas turbine material comprising the Ni-based alloy according to claim 1.

7. The Ni-based alloy according to claim 1, wherein the content of Ti is Ti: 1.80 to 2.50%.

8. The Ni-based alloy according to claim 1, wherein the content of Al is Al: 1.00 to 1.70%.

9. A method for manufacturing a Ni-based alloy, comprising:
subjecting a Ni-based alloy to a solution treatment, the Ni-based alloy having a composition consisting of, in terms of % by mass, Cr: 15.00 to 25.00%, Co: 8.00 to 15.00%, Mo: 1.00% or more and less than 12.00%, Ti: 1.50 to 2.50%, Al: 1.00 to 2.00%, Nb: 0.20 to 1.00%, and C: 0.0010 to 0.10% and, in terms of ppm by mass, P: 10 to 200 ppm, B: 30 to 250 ppm, and N: 30 to 200 ppm, with the remainder being Ni and unavoidable impurities; and
subsequently subjecting the Ni-based alloy to a first aging treatment at a temperature of 1010 to 1050° C. and then a second aging treatment at a temperature of 760 to 790° C.,
wherein the grain boundary coverage defined by the ratio of the length of grain boundaries covered with carbides to the length of grain boundaries in the alloy is 85% or more.

* * * * *